June 19, 1962 J. E. MURPHY ETAL 3,040,271
TRANSISTOR CONVERTER POWER SUPPLY SYSTEM
Filed Oct. 5, 1959 2 Sheets-Sheet 1

INVENTORS
Joseph E. Murphy &
BY Francis J. Starzec
Paul J. Ethington
ATTORNEY

June 19, 1962     J. E. MURPHY ETAL     3,040,271
TRANSISTOR CONVERTER POWER SUPPLY SYSTEM
Filed Oct. 5, 1959     2 Sheets-Sheet 2

INVENTORS
Joseph E. Murphy, &
BY Francis J. Starzec
Paul J. Ethington
ATTORNEY

United States Patent Office 3,040,271
Patented June 19, 1962

3,040,271
TRANSISTOR CONVERTER POWER
SUPPLY SYSTEM
Joseph E. Murphy, Cudahy, Wis., and Francis J. Starzec,
Fullerton, Calif., assignors to General Motors Corporation, Detroit, Mich., a corporation of Delaware
Filed Oct. 5, 1959, Ser. No. 844,567
7 Claims. (Cl. 331—113)

This invention relates to power supply systems and more particularly to a converter circuit utilizing a transistor oscillator and rectifier as a power supply for variable loads.

The transistor converter is especially well adapted for developing a relatively high direct voltage from a low direct voltage source and is especially useful as a power supply for mobile radio equipment or the like. When such converter circuits supply a constant load, the operating efficiency is relatively high and a very compact, lightweight, power supply system is realized. However, in many applications, the load on the converter circuit is variable, such as in radiotelephone equipment where the converter circuit supplies high voltage to both the transmitter and the receiver. In such applications the transmitter represents a considerably heavier load than the receiver and the current drawn may vary by a factor of the order of 2 to 1. When the converter circuit is designed for the high power load, the converter efficiency is substantially diminished in operation at the lighter load.

In the transistor oscillator of such converters, the feedback current necessary to start and sustain oscillations is determined by the magnitude of the load. The feedback current is, in turn, determined by the turns ratio of the feedback winding and the feedback circuit resistance. With these parameters designed for operation at the heaviest load to be encountered, the feedback current becomes excessive at reduced loads. Consequently, the excess feedback current results in dissipated power in the feedback circuit. Furthermore, the excessive feedback current causes the transformer core to be driven further into the saturation region than is necessary for proper switching action and, consequently, the transformer core loss is increased. It is therefore desirable to select the feedback current so that it is just sufficient to start and maintain oscillations for the existing load.

In accordance with this invention, the transistor oscillator is provided with feedback current or driving power which is changed in correspondence with load changes. Where the transistor converter supplies the transmitter and receiver of a radiotelephone, the feedback circuit is modified by switching means actuated by the push-to-talk relay. In one embodiment of the invention, the feedback circuit resistance is decreased by switching a resistor out of the feedback circuit for operation in supplying the transmitter or heavy load. In another embodiment, the feedback current is modified by tap switching on the feedback winding of the transformer. To ensure starting of the converter circuit under load, the starting bias in the feedback circuit must be apportioned to the selected load. This is accomplished concurrently with the modification of the feedback current by a voltage divider connected through the switching means with the starting resistors. Although the invention is of general application, as illustrated in connection with a radiotelephone, it is especially advantageous in applications where it is desirable to isolate the feedback current from the load current.

A more complete understanding of this invention may be had from the detailed description which follows, taken with the accompanying drawings in which.

Figure 1:
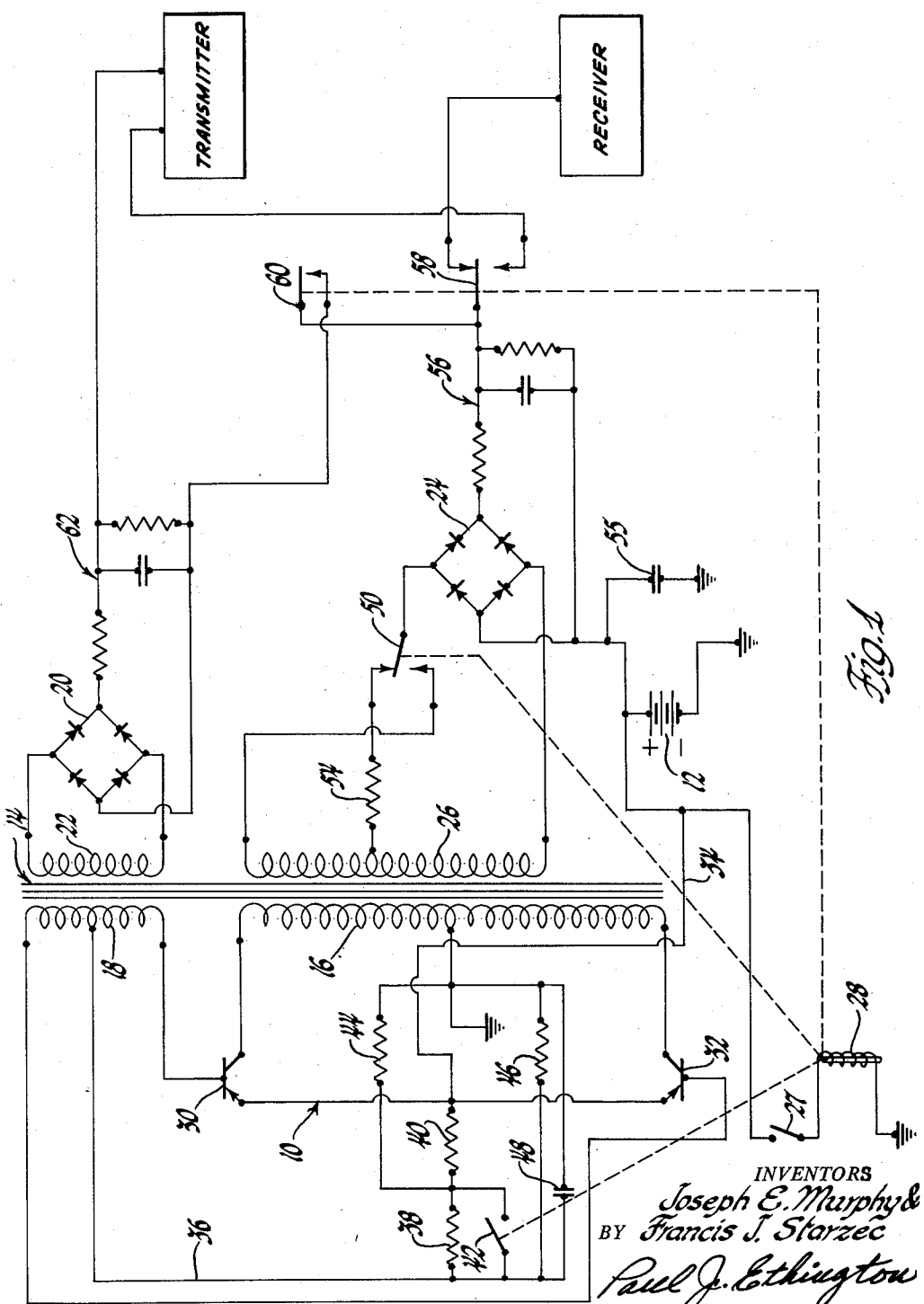
FIGURE 1 is a schematic diagram of the inventive converter circuit.

Referring now to the drawings, there is shown an illustrative embodiment of the invention in a power supply system using a converter circuit for developing relatively high direct voltages from a low voltage source for supplying the electron tube plate voltages of a transmitter and a receiver in a radiotelephone. In general, the converter circuit includes a transistor oscillator 10 energized from a direct voltage source or battery 12. A saturable core transformer 14 includes a primary winding 16 connected in the oscillator output circuit and includes a feedback winding 18 connected in oscillator feedback circuit for sustaining oscillations. A first load circuit including a rectifier 20 is connected across a transformer secondary winding 22 and a second load circuit including a rectifier 24 is connected across a selectable portion of a secondary winding 26. A push-to-talk switch 27 controls a relay 28 which actuates switching means in the load circuits and in the feedback circuit to selectively energize the receiver and transmitter and simultaneously change the feedback current or driving power in the transistor oscillator.

Considering the power supply circuits in more detail, the transistor oscillator 10 comprises a pair of transistors 30 and 32 connected in a common emitter configuration with the saturable core transformer 14. In the illustrative embodiment, the transistors are of the PNP type and the transformer core material is of the type having a substantially rectangular hysteresis loop. The oscillator is supplied from battery 12 which has its negative terminal connected to a point of reference potential or ground. In the oscillator output circuit, the emitter electrodes of the transistors are connected together and through a conductor 34 to the positive terminal of the battery. The primary winding 16 has a center tap connected to ground and the collector electrode of transistor 30 is connected through the upper half of primary winding 16 and through the center tap to ground. Similarly, the collector electrode of transistor 32 is connected through the lower half of the primary winding 16 and the center tap to ground. In the feedback circuit of the oscillator, the feedback winding 18 has a center tap connected through a conductor 36, a current limiting resistor 38, and a starting resistor 40 to the emitter electrodes of transistors 30 and 32. The base electrode of transistor 30 is connected through the lower half of the feedback winding 18 to the center tap and the base electrode of transistor 32 is connected through the upper half of the feedback winding to the center tap. A feedback selector switch 42 actuated by the relay 28 is connected in parallel with the current limiting resistor 38 and is closed when the relay 28 is energized. Starting current for the transistors 30 and 32 is provided by the voltage drop across the starting resistor 40 which is connected across the battery 12 in series with a voltage divider resistor 44. When the switch 42 is closed, the starting voltage across resistor 40 is increased by the connection of a voltage divider resistor 46 in parallel with resistor 44. A condenser 48 is connected between the center tap of the feedback winding and ground and hence in parallel with the current limiting resistor 38 and starting resistor 40 to modify the waveshape of the feedback current to enhance the switching action of the transistors.

The operation of the transistor oscillator is well known so a detailed description is omitted but a brief description will be helpful before further consideration of the inventive features. Starting of oscillations arises from inherent differences in the transistors 30 and 32, even though they are of the same type, since any slight unbalance causes the current in the input circuit of one transistor to exceed that of the other. For the sake of explanation, assume that the starting current of the transistor 30 predominates and causes its collector current, through upper half of primary winding 16, to increase. This increasing current will induce a voltage in the feedback winding 18 in the proper phase to increase the forward bias on transistor 30 causing it to become more conductive and will decrease the forward bias on transistor 32 causing it to become nonconductive. The collector current of transistor 30 increases substantially linearly with respect to time until the transformer core is driven into its saturation region. At this point, the rate of change of flux decreases and the induced voltage in the feedback winding decreases causing the conduction of transistor 30 to decrease. Consequently, the magnetic field of the transformer commences to collapse and the reversal of flux causes the induced voltage in the feedback winding to reverse in phase. This phase reversal causes transistor 30 to be cut off and transistor 32 to become conductive. Consequently, the collector current of transistor 32 through the lower half of the primary winding 16 increases until the transformer core reaches saturation at which time the feedback voltage decreases and reduces the conduction of transistor 32. Upon the collapse of the magnetic field of the transformer, the feedback voltage reverses in phase and transistor 32 is cut-off and transistor 30 is again turned on. This oscillatory action is maintained at a frequency determined primarily by the transformer core material, the transformer primary and feedback windings turns ratio, and the voltage of the battery 12. The alternating current in the primary winding 16 induces an alternating square wave voltage across the secondary windings 22 and 26 with an amplitude determined by the turns ratio of the primary and secondary windings.

In order to develop two different values of direct current plate supply voltage, for the receiver and transmitter respectively, the secondary winding 26 is connected through a voltage selector switch 50 to the rectifier 24. The switch 50 includes a back contact connected through a resistor 54 to an intermediate tap on secondary winding 26 and includes a front contact connected to the upper terminal of winding 26. The movable contact of the switch 50, actuated by the relay 28, engages the back contact when the relay is deenergized to develop a low plate supply voltage for the receiver and engages the front contact when the relay is energized to develop an intermediate value of plate supply voltage for the transmitter. The movable contact and the lower terminal of secondary winding 26 are connected across the input terminals of the rectifier 24 which is suitably a full wave bridge rectifier circuit. The output terminals of the rectifier are connected in series with the battery 12, to add the battery voltage to the rectifier output voltage. A filter condenser 55 is connected across the battery and a filter circuit 56 is connected across the rectifier output circuit to remove any ripple frequency from the output voltage. The output voltage is applied through a load selector switch 58 which has a movable contact actuated by the relay 28 and which engages a front contact to apply the intermediate plate supply voltage to the transmitter when the relay is energized and which engages a back contact to apply the low plate supply voltage to the receiver when the relay is deenergized.

In order to develop a high direct current plate supply voltage for the transmitter, the transformer secondary winding 22 is connected across the rectifier 20 and the voltage output therefrom is applied across a filter circuit 62. This output voltage is added to the voltage of battery 12 and rectifier 24 through a combining switch 60 which has a movable contact connected with the movable contact of switch 58 and a fixed contact connected with the negative output terminal of the rectifier 20. The positive output terminal of rectifier 20 is connected to the transmitter, and switch 60 is closed by relay 28 when it is energized. Thus when the relay 28 is energized, the voltage selector switch and the load selector switch engage their respective front contacts and the intermediate plate supply voltage is applied to the transmitter. At the same time, the combining switch 60 is closed and the high plate supply voltage is also applied to the transmitter.

Figure 2:
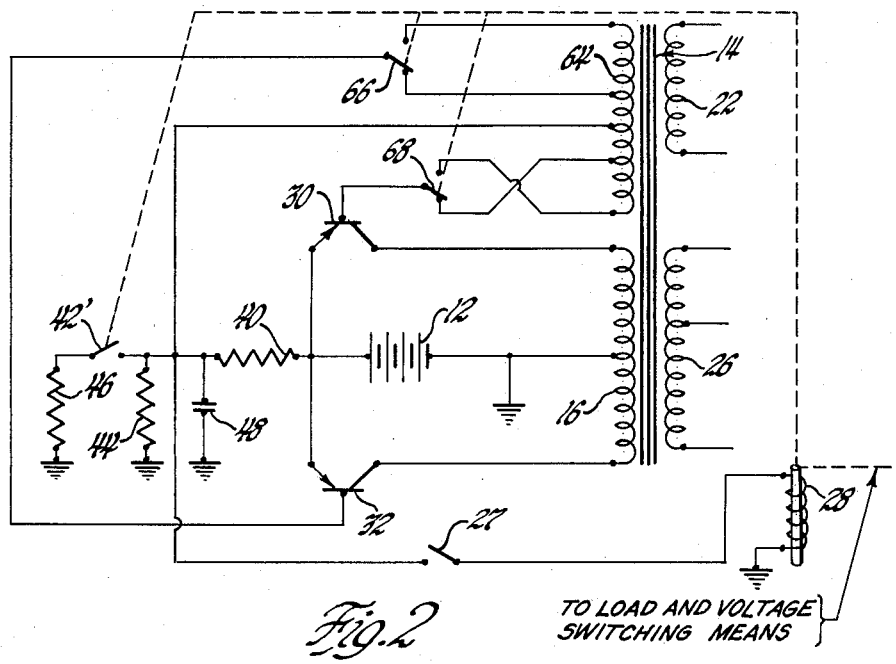
FIGURE 2 shows a modification of the converter circuit.

Before considering the operation of the power supply system, it will be helpful to consider the collector characteristics of a typical PNP junction transistor, as shown in FIGURE 2. FIGURE 2 shows a family of curves relating the collector current $I_c$ to the collector voltage $V_c$ for different values of base voltage $-V_{b1}$, $V_{b0}$, $+V_{b1}$, etc., the voltages being measured with respect to the emitter. With a resistive load, such as the plate supply load of the receiver, the transistor operating point will be on a load line $R_1$ which extends from a collector voltage $E$, corresponding to the battery voltage, to a collector current $E/R_1$. If the base voltage is caused to vary from $+V_{b1}$ to $-V_{b3}$, the collector current will vary along the load line $R_1$ from a value $O_1$, corresponding to collector cut-off to a value $S_1$ corresponding to collector saturation and the transistor is operated as a switch. The power dissipation at points $O_1$ and $S_1$ must be within the transistor rating but the dissipation at intermediate points exceed the rating without destructive effect if the transition is rapid and thus the load power may be many times the transistor power rating. The base voltage $-V_{b3}$ is sufficient to operate the transistor in the switching mode with a load corresponding to load line $R_1$ and additional base voltage does not produce any appreciable increase of the collector current. Consequently, any excessive base voltage is undesirable since it results only in wasted power which is dissipated in the base circuit. With an increased load, such as the plate supply of the transmitter, represented by the load line $R_2$, additional base voltage is required to operate the transistor in the switching mode. The load line $R_2$ extends from the collector voltage $E$ to the collector current $E/R_2$ and the base voltage required is $V_{b6}$. It is thus apparent that in order to obtain high efficiency operation of the transistor oscillator, the base voltage, and hence feedback current, must be changed in correspondence with load changes in order to avoid excessive base current at the lighter load.

As previously mentioned, the transformer 14 is preferably wound on a saturable core material having a substantially rectangular hysteresis loop to facilitate switching of the transistors. Considerable advantage is realized by using a bifilar primary winding on the transformer. This reduces the leakage reactance of the primary and consequently reduces the magnitude of the reflected voltage spike which occurs across the non-conducting transistor due to decreasing collector current. Consequently, there is less heating of the transistors and transistors with a lower collector to emitter voltage rating may be used. Additionally the bifilar primary winding provides a balanced coupling between either half of the primary and either secondary winding.

In operation, with the push-to-talk switch 27 open, the relay 28 is deenergized and the power supply system furnishes plate supply voltage to the receiver. The voltage selector switch 50 and the load selector switch 58 engage their respective back contacts and the secondary winding 26 is connected across the rectifier 24 through resistor 54 and the direct voltage from the rectifier is applied to the receiver. At the same time, the combining switch 60 is open and feedback selector switch 42 is open so that the starting voltage is developed across resistor 40 in series with voltage divider resistor 44 and is just sufficient to cause the oscillator to start with the receiver load connected. The feedback current is limited by the series resistance of current limiting resistor 38 and the starting resistor 40 so that it is just sufficient to maintain oscillations under the existing load. Accordingly, the power supply is operated at a high efficiency level. When the push-to-talk switch 27 is closed, the relay 28 is energized, and the voltage selector switch 50 and the load selector switch 58 engage the respective front contacts and the full voltage of secondary winding 26 is applied across the rectifier 24. The rectifier voltage is applied through the filter 56 and the load selector switch 58 to supply intermediate plate voltage to the transmitter. At the same time, switch 60 is closed and the voltages of the rectifier 24 and battery 12 are added to the voltage of rectifier 20 derived from secondary winding 22 to supply a high plate supply voltage to the transmitter. In this condition, the feedback selector switch 42 is closed and the voltage divider resistor 46 is connected in parallel with voltage divider resistor 44 and the starting voltage across a resistor 40 is increased commensurately with the load increase to insure oscillator starting. Furthermore, the current limiting resistor 38 is shunted out of the feedback circuit and the feedback current is increased to a value just sufficient to maintain oscillations for existing loads. Accordingly, maximum operating efficiency is achieved during operation under the increased load imposed by the transmitter.

Figure 3:
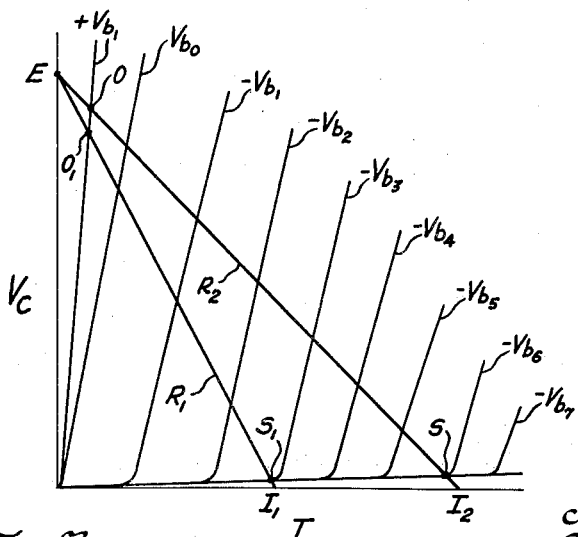
FIGURE 3 is a graphical representation of the transistor collector characteristics, together with two different load lines for the converter circuit.

FIGURE 3 shows a modification of the invention in which the feedback current is modified by changing the turns ratio of the feedback transformer instead of by changing resistance of the feedback circuit. In FIGURE 3, only the modified portion of the circuit is illustrated and the parts thereof which are the same as corresponding parts in the embodiment of FIGURE 1 are designated by the same reference characters. The feedback winding 64 of the transformer 14 is connected to the base electrodes of the transistors 30 and 32 through a pair of feedback selector switches 66 and 68. The end terminals of the feedback winding are connected respectively to the front contacts of switches 66 and 68 and a pair of intermediate taps of feedback winding are connected to the back contacts respectively of the feedback selector switches 66 and 68. The center tap of the feedback winding is connected through the starting resistor 40 to the emitter electrodes of transistors 30 and 32. In order to change the starting current in accordance with load selection, the voltage divider resistor 46 is connected through a switch 42' in parallel with the voltage divider resistor 44. The switch 42' is actuated by the relay 28 and is opened when the relay is deenergized and closed when it is energized.

In operation of the embodiment of FIGURE 3 for supplying the light load of the receiver, the push-to-talk switch 27 is open and the feedback selector switches 66 and 68 connect the intermediate taps of the feedback winding across the feedback circuit. Similarly, the switch 42' is open and the starting resistor 40 is connected in series with voltage divider resistor 44 to develop the required starting voltage for the oscillator. The feedback voltage developed across the intermediate taps is just sufficient to maintain oscillation without excess feedback current. When the push-to-talk switch is closed to energize the transmitter, the relay 28 is energized and the feedback selector switches 66 and 68 engage the front contacts and connect the full feedback winding across the feedback circuit. At the same time, the switch 42' is closed and the resistor 46 is connected in parallel with the resistor 44 to increase the starting voltage across resistor 40. Thus the starting current is just sufficient to start the oscillator with the transmitter load connected and the feedback current is just sufficient to maintain oscillations. Accordingly, a high efficiency operation is achieved in supplying the heavy load imposed by the transmitter.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

We claim:
1. A power supply system comprising a direct voltage source, a transistor having input, output and common electrodes, a transformer having primary, secondary, and feedback windings, an output circuit for the transistor including the primary winding and the voltage source connected between the output electrode and common electrode, a feedback circuit including the feedback winding and an impedance element connected between the input electrode and the common electrode whereby the transistor is maintained in oscillation between a conductive state and a non-conductive state, first switching means operatively connected with the secondary winding to selectively connect it with different load devices, second switching means connected with the feedback circuit for changing the value of feedback current, and an actuator connected with the first and second switching means for simultaneous selection of the load device and value of feedback current.

2. A power supply system comprising a direct voltage source, a pair of transistors each having emitter, base, and collector electrodes, a transformer having primary and feedback windings with respective center taps and having a secondary winding, a transistor output circuit including the primary winding connected between the collector electrodes and the voltage source connected between the center tap of the primary winding and the emitter electrodes, a feedback circuit for the transistors including the feedback winding connected between the base electrodes with the center tap of the feedback winding connected to the emitter electrodes whereby the transistors are maintained in a state of oscillation, first switching means operatively connected with the secondary winding to selectively connect it with different load devices, second switching means connected with said feedback circuit for changing the value of feedback current, and a relay connected with said first and second switching means for simultaneous selection of load devices and value of feedback current.

3. A power supply system comprising a direct voltage source, a pair of transistors each having emitter, base and collector electrodes, a transformer having primary and feedback windings with respective center taps and having a secondary winding, a transistor output circuit including the primary winding connected between the collector electrodes and the voltage source connected between the center tap of the primary winding and the emitter electrodes, a feedback circuit for the transistors including the feedback winding connected between the base electrodes, a resistor connected between the center tap of the feedback transformer and the emitter electrodes, whereby the transistors are maintained in a state of oscillation, first switching means operatively connected with the secondary winding to selectively connect it with different load devices, second switching means connected in parallel with said resistor for changing the value of feedback current, and a relay connected with said first and second switching means for actuation thereof for simultaneous selection of the load device and value of feedback current.

4. A power supply system comprising a direct voltage source, a pair of transistors each having emitter, base, and collector electrodes, a transformer having a primary winding with a center tap, a secondary winding, and a feedback winding, a transistor output circuit including the primary winding connected between the collector electrodes and the voltage source connected between the center taps and the emitter electrodes, said feedback winding having a pair of end terminals, a center tap and a pair of intermediate terminals, a feedback circuit for the transistors including first switching means for selectively connecting the feedback winding between the base electrodes through the end terminals or the intermediate terminals, said feedback winding center tap being connected with the emitter electrodes, second switching means operatively connected with the secondary winding to selectively connect it with different load devices, and a relay connected with the first and second switching means for actuation thereof for simultaneous selection of the load device and the feedback winding terminals.

5. A power supply system comprising a direct voltage source, a pair of transistors each having emitter, base and collector electrodes, a transformer having primary and feedback windings with respective center taps and having a secondary winding, a transistor output circuit including the primary winding connected between the collector electrodes and the voltage source connected between the center tap of the primary winding and the emitter electrodes, a feedback circuit for the transistors including the feedback winding connected between the base electrodes, a current limiting resistor and a starting resistor serially connected between the center tap of the feedback transformer and emitter electrodes, a voltage divider resistor connected in series with the starting resistor across the voltage source to provide a starting bias voltage on the emitter electrodes, whereby the transistors become alternately conductive and non-conductive and are maintained in a state of oscillation, first switching means operatively connected with the secondary winding to selectively connect it with different load devices, second switching means connected in parallel with said current limiting resistor for changing the value of feedback current, and a relay connected with said first and second switching means for actuation thereof for simultaneous selection of the load device and the value of feedback current.

6. A power supply system comprising a direct voltage source, a pair of transistors each having emitter, base and collector electrodes, a transformer having primary and feedback windings with respective center taps and having a secondary winding, a transistor output circuit including the primary winding connected between the collector electrodes and the voltage source connected between the center tap of the primary winding and the emitter electrodes, a feedback circuit for the transistors including the feedback winding connected between the base electrodes, a current limiting resistor and a starting resistor serially connected between the center tap of the feedback transformer and emitter electrodes, a first voltage divider resistor connected in series with the starting resistor across the voltage source to provide a starting bias voltage on the emitter electrodes, whereby the transistors are maintained in a state of oscillation, first switching means operatively connected with the secondary winding to selectively connect it with different load devices, second switching means connected in parallel with said current limiting resistor for changing the value of feedback current, and a second voltage divider resistor connected in parallel with the first voltage divider resistor through the second switching means for changing the starting bias voltage, and a relay connected with said first and second switching means for actuation thereof for simultaneous selection of the load device and the value of feedback current.

7. A power supply system comprising a direct voltage source, a pair of transistors each having emitter, base, and collector electrodes, a transformer having a primary winding with a center tap, a secondary winding, and a feedback winding, a transistor output circuit including the primary winding connected between the collector electrodes and the voltage source connected between the center tap and the emitter electrodes, said feedback winding having a pair of end terminals, a center tap and a pair of intermediate terminals, a feedback circuit for the transistors including first switching means for selectively connecting the feedback winding between the base electrodes through the end terminals or the intermediate terminals, said feedback winding center tap being connected with the emitter electrodes through a starting resistor, a first voltage divider resistor connected in series with the starting resistor across the voltage source, a second voltage divider resistor and a second switching means connected across the first voltage divider resistor for changing the value of starting current, third switching means operatively connected with the secondary winding to selectively connect it with different load devices, and a relay connected with all of said switching means for actuation thereof for simultaneous selection of the load device, the feedback winding terminals, and the value of starting current.

References Cited in the file of this patent
UNITED STATES PATENTS 2,441,435     Mittlemann _____ May 11, 1948
2,896,146     Jenkins _____ July 21, 1959